United States Patent
Ishio (10) Patent No.: US 6,789,431 B2
(45) Date of Patent: Sep. 14, 2004

(54) DIAPHRAGM-TYPE SEMICONDUCTOR PRESSURE SENSOR

(75) Inventor: Seiichiro Ishio, Kariya (JP)

(73) Assignee: DENSO Corporation, Kariya (JP)

(*) Notice: Subject to any disclaimer, the term of this patent is extended or adjusted under 35 U.S.C. 154(b) by 0 days.

(21) Appl. No.: 10/428,133

(22) Filed: May 2, 2003

(65) Prior Publication Data

US 2003/0217603 A1 Nov. 27, 2003

(30) Foreign Application Priority Data

May 21, 2002 (JP) ........................................ 2002-146500

(51) Int. Cl.[7] .............................. G01L 9/00; G01L 9/16
(52) U.S. Cl. ...................................................... 73/754
(58) Field of Search ......................... 73/715–727, 754; 438/50, 53, 456; 338/2–4, 42

(56) References Cited

U.S. PATENT DOCUMENTS

| | | | | |
|---|---|---|---|---|
| 3,697,918 A | * | 10/1972 | Orth et al. ........................ | 338/3 |
| 3,772,628 A | * | 11/1973 | Underwood et al. ............ | 338/4 |
| 3,848,329 A | * | 11/1974 | Igarashi et al. ................ | 438/50 |
| 3,893,228 A | * | 7/1975 | George et al. ................ | 438/53 |
| 4,050,313 A | * | 9/1977 | Shimada et al. ............... | 73/727 |
| 4,439,752 A | | 3/1984 | Starr | |
| 5,614,678 A | * | 3/1997 | Kurtz et al. ................... | 73/727 |
| 5,702,619 A | * | 12/1997 | Kurtz et al. ................... | 216/2 |
| 2001/0039837 A1 | | 11/2001 | Tanizawa et al. | |

FOREIGN PATENT DOCUMENTS

JP    B2-3359493    10/2002

* cited by examiner

Primary Examiner—William Oen
(74) Attorney, Agent, or Firm—Posz & Bethards, PLC (57) ABSTRACT

A diaphragm-type semiconductor pressure sensor includes a substantially rectangular (110) semiconductor substrate, which has four sides, an active surface of (110) crystallographic face orientation, and a back surface, which is opposite to the active surface, of (110) crystallographic face orientation. Each of the surfaces is surrounded by the four sides. Each of the four sides is at an angle of substantially 45 degrees with a crystallographic axis of <110> orientation that is substantially parallel to the active surface. The substrate includes a diaphragm in the active surface. The diaphragm has been formed by forming a recess in the back surface. The diaphragm includes a gauge resistor. A pressure is detected on the basis of the variation in the resistance of the gauge resistor.

13 Claims, 10 Drawing Sheets

DIAPHRAGM-TYPE SEMICONDUCTOR PRESSURE SENSOR

CROSS REFERENCE TO RELATED APPLICATION

This application is based on and incorporates herein by reference Japanese Patent Application No. 2002-146500 filed on May 21, 2002.

BACKGROUND OF THE INVENTION

The present invention relates to a diaphragm-type semiconductor pressure sensor, which includes a semiconductor substrate having: active surface and back surface of (110) crystallographic face orientation; and a diaphragm that has been formed in the active surface by forming a recess in the back surface, and relates to a semiconductor wafer used for manufacturing the diaphragm-type semiconductor pressure sensor.

The diaphragm-type semiconductor pressure sensor includes a semiconductor substrate that has an active surface of (110) crystallographic face orientation and a back surface, which is opposite to the active surface, of (110) crystallographic face orientation. Hereafter, this type of semiconductor substrate will be referred as a (110) semiconductor substrate.

Figure 12:
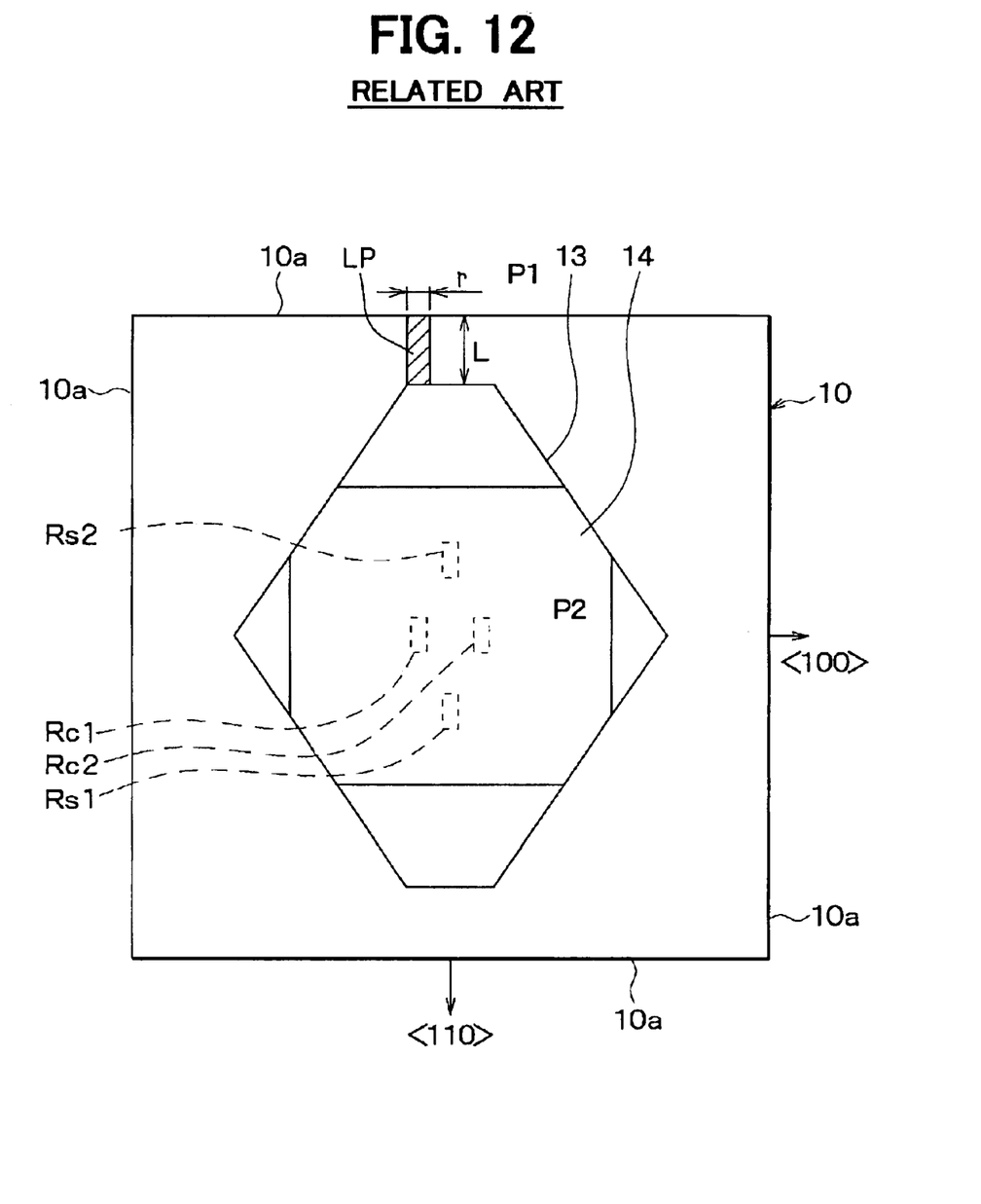
FIG. 12 is a schematic plan view of a proposed diaphragm-type semiconductor pressure sensor manufactured using a (110) semiconductor substrate, showing a recess and a diaphragm located at the bottom of the recess.

As shown in FIG. 12, a proposed diaphragm-type semiconductor pressure sensor includes a rectangular (110) semiconductor substrate 10 having four sides 10a. The (110) semiconductor substrate 10 includes a diaphragm 14 used for detecting a pressure. The diaphragm 14 is located at a bottom of a recess 13, or in the active surface of the (110) semiconductor substrate 10. The recess 13 has been formed by an isotropically etching a portion of a silicon substrate, from which the (110) semiconductor substrate has been formed, from the back surface thereof.

The diaphragm 14 includes gauge resistors Rc1, Rc2, Rs1, Rs2, which are piezoresistive elements. As shown in FIG. 12, the gauge resistors Rc1, Rc2, Rs1, Rs2 are made up of two center gauge resistors Rc1, Rc2, which are located at the central area of the diaphragm 14, and two side gauge resistors Rs1, Rs2, which are located at the periphery of the diaphragm 14. The four gauge resistors Rc1, Rc2, Rs1, Rs2 make up a bridge circuit used for detecting the pressure. When the diaphragm 14 is strained by a pressure to be detected, the resistances of the gauge resistors Rc1, Rc2, Rs1, Rs2 vary in response to the strain of the diaphragm 14, and the pressure is detected on the basis of the variation in the resistances.

In the manufacturing process of the proposed diaphragm-type semiconductor pressure sensor, a plurality of rectangular regions, which become sensor chips, are formed in a silicon wafer, which has an active surface of (110) crystallographic face orientation, a back surface, which is opposite to the active surface, of (110) crystallographic face orientation, and an orientation flat having a crystallographic face of (100) orientation. The regions are defined by forming scribe lines substantially parallel to the orientation flat and scribe lines substantially orthogonal to the orientation flat. Then, gauge resistors Rc1, Rc2, Rs1, Rs2 are formed using semiconductor process techniques such as ion implantation and diffusion in the area of each of the regions where a diaphragm 14 is to be formed. Next, a portion of the silicon wafer is anisotropically etched from the back surface in each of the regions to form a recess 13 and simultaneously the diaphragm 14 in the active surface of the silicon wafer. With the above steps, a (110) semiconductor wafer is formed. Finally, the (110) semiconductor wafer is diced into a plurality of semiconductor pressure sensors shown in FIG. 12.

In the semiconductor pressure sensor of FIG. 12, in which a (110) semiconductor substrate is used, the strain of the diaphragm 14 is used for detecting the pressure applied to the diaphragm 14, as described above. Two crystallographic axes of <110> and <100> orientations exist on a crystallographic plane of (100) orientation. However, the piezoresistive coefficient of silicon along a crystallographic axis of <110> orientation is much greater, for example, about fifty times greater, than that along a crystallographic axis of <100> orientation. That is, the sensitivity in detecting the strain generated along a crystallographic axis of <110> orientation is much greater than that along a crystallographic axis of <100>orientation. Therefore, the gauge resistors Rc1, Rc2, Rs1, Rs2 have been formed such that the gauge resistors Rc1, Rc2, Rs1, Rs2 substantially extend along a crystallographic axis of <110> orientation in the semiconductor pressure sensor of FIG. 12 in order to increase the sensitivity.

A crystallographic plane of (100) orientation includes only one crystallographic axis of <110> orientation, so the arrangement of the gauge resistors Rc1, Rc2, Rs1, Rs2 shown in FIG. 12 is substantially the best to gain the highest sensitivity in pressure detection. The pressure sensor of FIG. 12 has been bonded to a sealing substrate such as a glass stand, which is not shown in the figure, at the back surface of the (110) semiconductor substrate 10 using anodic bonding and so on such that the recess 13 is hermetically sealed by the sealing substrate to form a pressure reference room.

Lately, there have been demands for shrinking the semiconductor pressure sensor of FIG. 12 for the purpose of cost reduction and soon. To shrink the semiconductor pressure sensor of FIG. 12, the (110) semiconductor substrate 10 needs to be shrunk.

However, if the (110) semiconductor substrate 10 was shrunk with simply shrinking the diaphragm 14 without changing layout, the sensitivity in pressure detection would worsen. Even if the (110) semiconductor substrate 10 was shrunk without shrinking the diaphragm 14 or changing layout, the minimum width L of the contact area between the back surface of the (110) semiconductor substrate 10 and the sealing substrate would become narrower. That is, the frame-like portion of the (110) semiconductor substrate 10, which surrounds the diaphragm 14, needs to be narrowed.

The hermeticity of the pressure reference room is expressed using the molecular leak rate equation (1) in vacuum engineering, $$Q = (2\pi V/3) \times r^3 \times (P1-P2)/L \qquad (1)$$

where Q is the leak rate of the pressure reference room, r is the radius of a leak passage LP at the boundary between the back surface of the (110) semiconductor substrate 10 and the sealing substrate, L is the length of the leak passage LP, or the above-mentioned minimum width of the back surface, V is the average velocity of gas molecules, P1 is the pressure outside the pressure reference room, and P2 is the pressure in the pressure reference room. As understood from the equation (1), the leak rate Q is inversely proportionate to the length L of the leak passage LP. Therefore, if the (110) semiconductor substrate 10 was shrunk without shrinking the diaphragm 14 or changing layout, it would become difficult to assure the hermeticity of the pressure reference room. As a result, the reliability of the pressure sensor of FIG. 12 would worsen.

SUMMARY OF THE INVENTION

The present invention has been made in view of the above aspects. A first object of the present invention is to shrink a diaphragm-type semiconductor pressure sensor without shrinking the diaphragm thereof or shortening the minimum width of the back surface thereof in order to make the most of the dimensions of the sensor. A second object of the present invention is to provide a semiconductor wafer that can be used to shrink a diaphragm-type semiconductor pressure sensor in order to make the most of the dimensions of the sensor.

To achieve the first object, a diaphragm-type semiconductor pressure sensor according to the present invention includes a substantially rectangular (110) semiconductor substrate, which has four sides, an active surface of (110) crystallographic face orientation, and a back surface, which is opposite to the active surface, of (110) crystallographic face orientation. Each of the surfaces is surrounded by the four sides. Each of the four sides is at an angle of substantially 45 degrees with a crystallographic axis of <110> orientation that is substantially parallel to the active surface. The substrate includes a diaphragm in the active surface. The diaphragm has been formed by forming a recess in the back surface. The diaphragm includes a gauge resistor. A pressure is detected on the basis of the variation in the resistance of the gauge resistor.

To achieve the second object, a semiconductor wafer according to the present invention that is used for manufacturing a diaphragm-type semiconductor pressure sensor includes a (110) semiconductor layer. The (110) semiconductor layer includes an active surface of (110) crystallographic face orientation, and a back surface, which is opposite to the active surface, of (110) crystallographic face orientation, and an orientation flat. A plurality of scribe lines are located on the active surface. The orientation flat is at an angle of substantially 45 degrees with a crystallographic face of (100) orientation that is substantially orthogonal to the active surface of the (110) semiconductor layer. Each of the scribe lines is substantially parallel or orthogonal to the orientation flat. The (110) semiconductor layer also includes substantially rectangular regions, which are defined by the scribe lines. Each of the regions includes a diaphragm in the active surface. The diaphragm has been formed by forming a recess in the back surface. The diaphragm includes a gauge resistor. A pressure is detected on the basis of the variation in the resistance of the gauge resistor in a diaphragm-type semiconductor pressure sensor manufactured from the semiconductor wafer.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
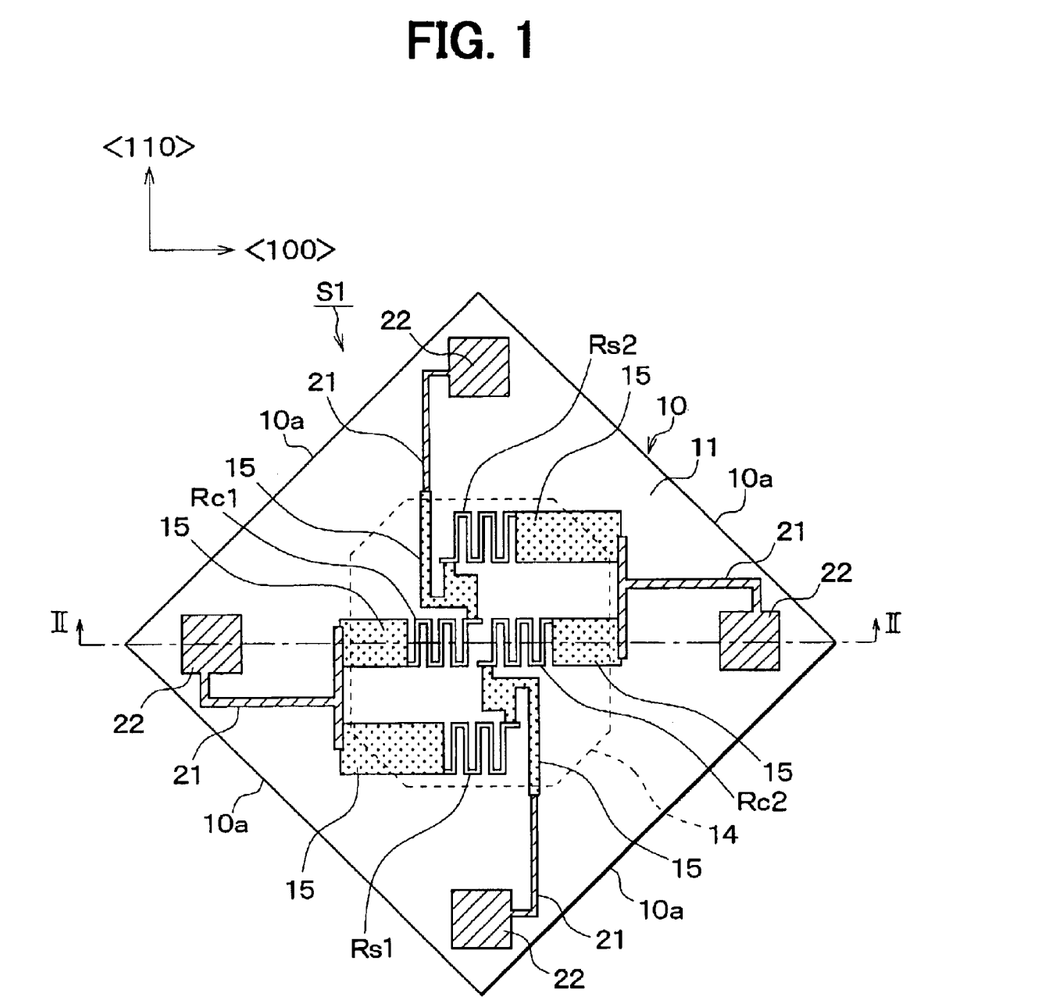
FIG. 1 is a schematic plan view of a diaphragm-type semiconductor pressure sensor according to an embodiment of the present invention.
Figure 2:
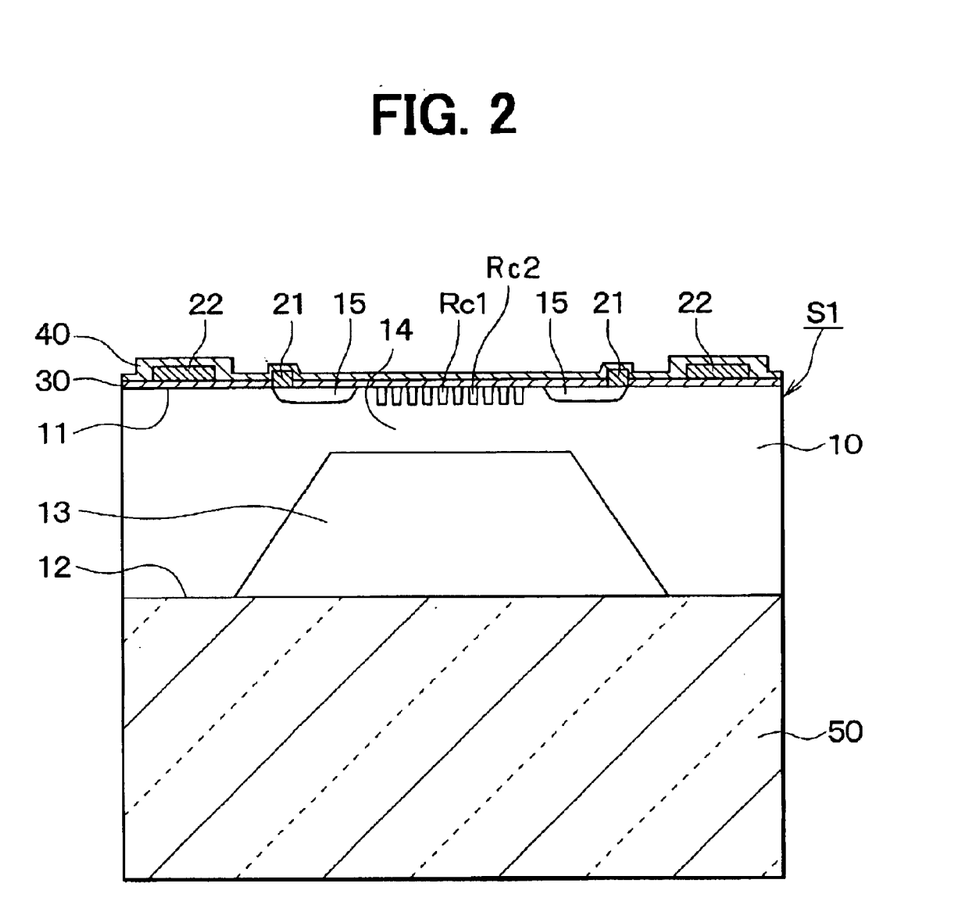
FIG. 2 is a schematic cross-sectional view of the semiconductor pressure sensor of FIG. 1 taken along the line II—II, showing the state that the sensor of FIG. 1 has been bonded to a glass stand.
Figure 3:
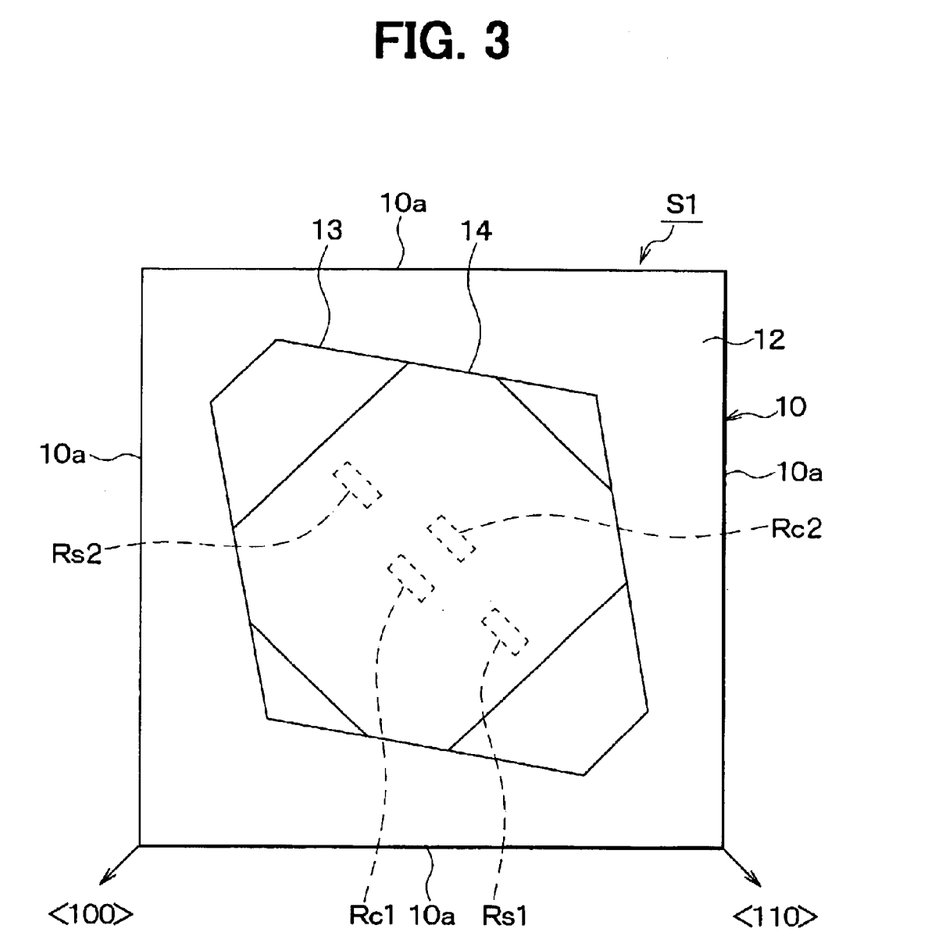
FIG. 3 is a schematic plan view of the semiconductor pressure sensor of FIG. 1 when viewed from the behind of the sensor in FIG. 1.

The present invention will be described in detail with reference to an embodiment. A diaphragm-type semiconductor pressure sensor S1 shown in FIGS. 1 to 3 includes a semiconductor substrate 10 made substantially of silicon, which has been formed using well-known semiconductor chip manufacturing technique. The semiconductor substrate 10 is shaped like a rectangular plate. As shown in FIGS. 1 to 3, the semiconductor substrate 10 has an active surface 11, a back surface 12, which is opposite to the active surface 11, and four sides 10a. Each of the surfaces 11, 12 has a crystallographic face of (110) orientation.

As shown in FIG. 2, the semiconductor substrate 10 is basically made of a silicon substrate of one conductivity type. However, the semiconductor substrate 10 may be basically made of two layer shaving a different conductivity type. For example, one of the two layers may be a p-type silicon substrate, and the other may be an n-type epitaxial layer.

As shown in FIGS. 2 and 3, the semiconductor substrate 10 has a recess 13, which has been formed using anisotropic etching with an alkaline solution, in the back surface 12 and a diaphragm 14 at the bottom of the recess 13, where the semiconductor substrate 10 has been thinned by forming the recess 13. As shown in FIGS. 1 and 3, the diaphragm 14 is octagonal. Two sides of the octagonal diaphragm 14 are substantially orthogonal to a crystallographic axis of <100> orientation substantially parallel to the active surface 11. Other two sides of the octagonal diaphragm 14 are substantially orthogonal to a crystallographic axis of <110> orientation substantially parallel to the active surface 11. The other two sides of the octagonal diaphragm 14 are substantially orthogonal to a <111> crystallographic axis substantially parallel to the active surface 11.

The octagonal diaphragm 14 can be formed using an etching mask having a hexagonal opening and anisotropic etching. Instead of the octagonal diaphragm 14, a diaphragm in a different shape such as a rectangle may be formed as long as the diaphragm in the different shape is formed by anisotropically etching a (110) semiconductor substrate.

The diaphragm 14 includes four gauge resistors Rc1, Rs1, Rc2, Rs2, which are piezoresistive elements. The gauge resistors Rc1, Rs1, Rc2, Rs2 substantially extend along a crystallographic axis of <110> orientation substantially parallel to the active surface 11 because the piezoresistive coefficient of silicon is higher along a crystallographic axis of <110> orientation than along any other crystallographic axis. When the diaphragm 14 is strained by a pressure to be detected, the resistances of the gauge resistors Rc1, Rs1, Rc2, Rs2 vary in response to the strain of the diaphragm 14, and the pressure is detected on the basis of the variations in the resistances.

Figure 4:
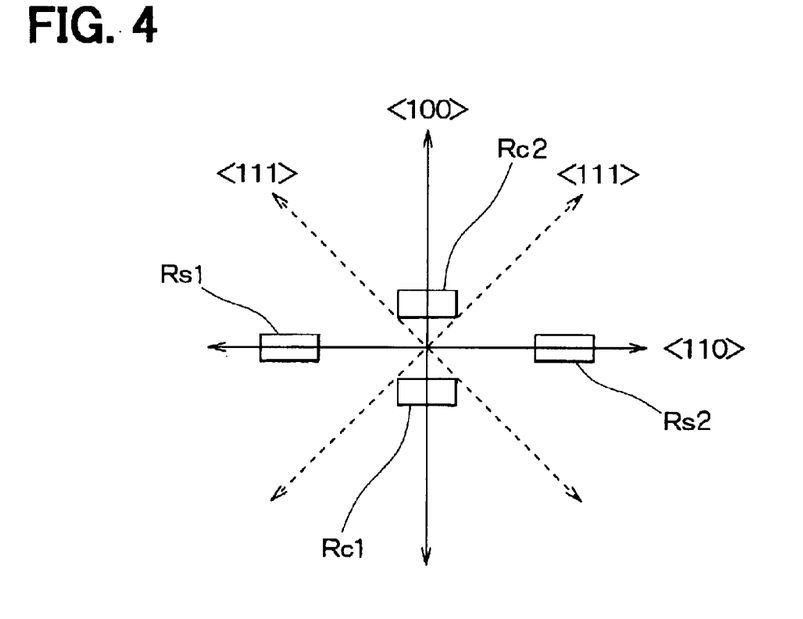
FIG. 4 is a view showing the crystallographic axes that are located on the active surface of the substrate included in the pressure sensor of FIG. 1.

As shown in FIGS. 1, 3, and 4, the gauge resistors Rc1, Rs1, Rc2, Rs2 are made up of first and second center gauge resistors Rc1, Rc2, which are located at the central area of the diaphragm 14, and first and second side gauge resistors Rs1, Rs2, which are located at the periphery of the diaphragm 14. The center gauge resistors Rc1, Rc2 strain easier than the side gauge resistors Rs1, Rs2. That is, the resistances of the center gauge resistors Rc1, Rc2 change more sensitively to the pressure to be detected than those of the side gauge resistors Rs1, Rs2. The gauge resistors Rc1, Rs1, Rc2, Rs2 have been formed by implanting and diffusing ions in a silicon layer from which the semiconductor substrate 10 is formed. The gauge resistors Rc1, Rs1, Rc2, Rs2 are electrically connected by wiring diffusion regions 15, which also have been formed by implanting and diffusing ions in the silicon layer.

Figure 5:
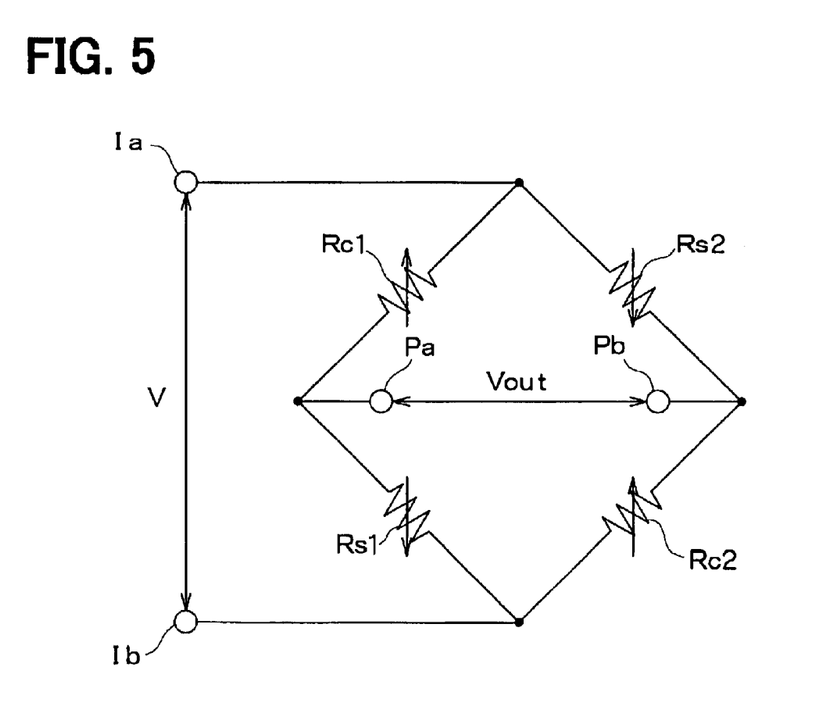
FIG. 5 is an equivalent circuit diagram for a Wheatstone bridge included in the pressure sensor of FIG. 1.

As shown in FIG. 1, the center gauge resistors Rc1, Rc2 and the side gauge resistors Rs1, Rs2 are serially connected using the wiring diffusion regions 15 to form a Wheatstone bridge, which a closed circuit made up of four resistive sides as shown in FIG. 5. In the bride circuit diagram of FIG. 5, a direct current constant voltage V is applied between two terminals Ia, Ib.

The resistances of the center gauge resistors Rc1, Rc2 increase more sensitively to the pressure to be detected than those of the side gauge resistors Rs1, Rs2. Therefore, a first potential Pa at a point between the first center gauge resistor Rc1 and the first side gauge resistor Rs1 and a second potential Pb at a point between the second center gauge resistor Rc2 and the second side gauge resistor Rs2 vary in the opposite direction when the diaphragm 14 strains due to a pressure applied to the diaphragm 14. That is, when one of the potentials Pa, Pb increases, the other decreases. Therefore, the differential potential Vout between the first and second potentials Pa, Pb varies in response to the pressure applied to the diaphragm 14.

As shown in FIG. 1, metal wiring lines 21 and metal pads 22 are located on the active surface 11 outside the diaphragm 14. The wiring lines 21 and the metal pads 22 are electrically connected to the wiring diffusion regions 15 for electrically connecting the wiring diffusion regions together, forming the two terminals Ia, Ib, between which the direct current constant voltage V is applied, and picking up the differential potential Vout between the first and second potentials Pa, Pb from the bridge circuit formed on the semiconductor substrate 10. The bridge circuit is electrically connected to an outside circuit through bonding wires that are wire bonded to the metal pads 22.

As shown in FIG. 2, an interlayer insulating film 30, which is, for example, a silicon oxide film, is located on the active surface of the semiconductor substrate 10. The metal pads 22 are insulated by the insulating film 30. The wiring lines 21 are also insulated by the insulating film 30 except for the portions at which the wiring lines 21 are electrically connected to the wiring diffusion regions 15 through contact holes in the insulating film 30. The wiring lines 21 and the metal pads 22 can be formed, for example, by vacuum evaporation of aluminum.

As shown in FIG. 2, a passivation film 40, which is made of, for example, silicon nitride, is located on the wiring lines 21, the metal pads 22, and the insulating film 30 to protect the pressure sensor S1 of FIG. 1. Although not illustrated in the figure, the passivation film 40 has openings on the metal pads 22 to permit the metal pads 22 to be electrically connected to an outside circuit by wire bonding.

The pressure sensor S1 of FIG. 1 can be manufactured using well-known semiconductor manufacturing techniques. After a pressure sensor S1 is manufactured, the pressure sensor S1 is bonded at the back surface 12 thereof to a glass stand 50 using, for example, anodic bonding. With the bonding, a recess 13 of the pressure sensor Si is hermitically sealed to form a pressure reference chamber, the pressure in which is maintained constant, for example, at a level close to vacuum, as shown in FIG. 2.

In FIG. 2, the pressure to be detected is applied to the upper side of the diaphragm 14. When the diaphragm 14 is strained by the pressure, the resistances of the gauge resistors Rc1, Rs1, Rc2, Rs2 vary in response to the strain generated the diaphragm 14, and the differential potential Vout correlated to the resistance variations is outputted. The differential potential Vout is sent through the metal pads 22 to an outside circuit. The differential potential Vout is processed by the outside circuit to provide the final output signal for detecting the pressure.

A unique arrangement has been employed in the semiconductor pressure sensor S1 of FIG. 1, the fundamental structure and the operation of which are described above. The unique arrangement enable the pressure sensor Si to be smaller than the proposed pressure sensor of FIG. 12 without shrinking the diaphragm 14 or shortening the minimum width of the contact area between the back surface 12 of semiconductor substrate 10 and the glass stand 50. Specifically, as shown in FIG. 3, each of the four sides 10a is at an angle of substantially 45 degrees with the crystallographic axis of <110> orientation that is substantially parallel to the active surface 11. In addition, when the direction of the diaphragm 14 is defined as the longitudinal direction of the recess 13, the diaphragm 14 is arranged such that the direction of the diaphragm 14 is at an angle of substantially 45 degrees with the four sides 10a.

As shown in FIG. 1, each of the gauge resistors Rc1, Rs1, Rc2, Rs2 has been folded to form a plurality of beams, which extend substantially along the crystallographic axis of <110> orientation. Therefore, each of the gauge resistors Rc1, Rs1, Rc2, Rs2 substantially extends along the crystallographic axis of <110> orientation. Each of the beams is also at an angle of substantially 45 degrees with the crystallographic axis of <110> orientation. With the above arrangement, the pressure sensor S1 of FIG. 1 can be smaller than the proposed pressure sensor of FIG. 12 without shrinking the diaphragm 14 or shortening the minimum width of the contact area between the back surface 12 of semiconductor substrate 10 and the glass stand 50, as shown in FIG. 6.

Figure 6:
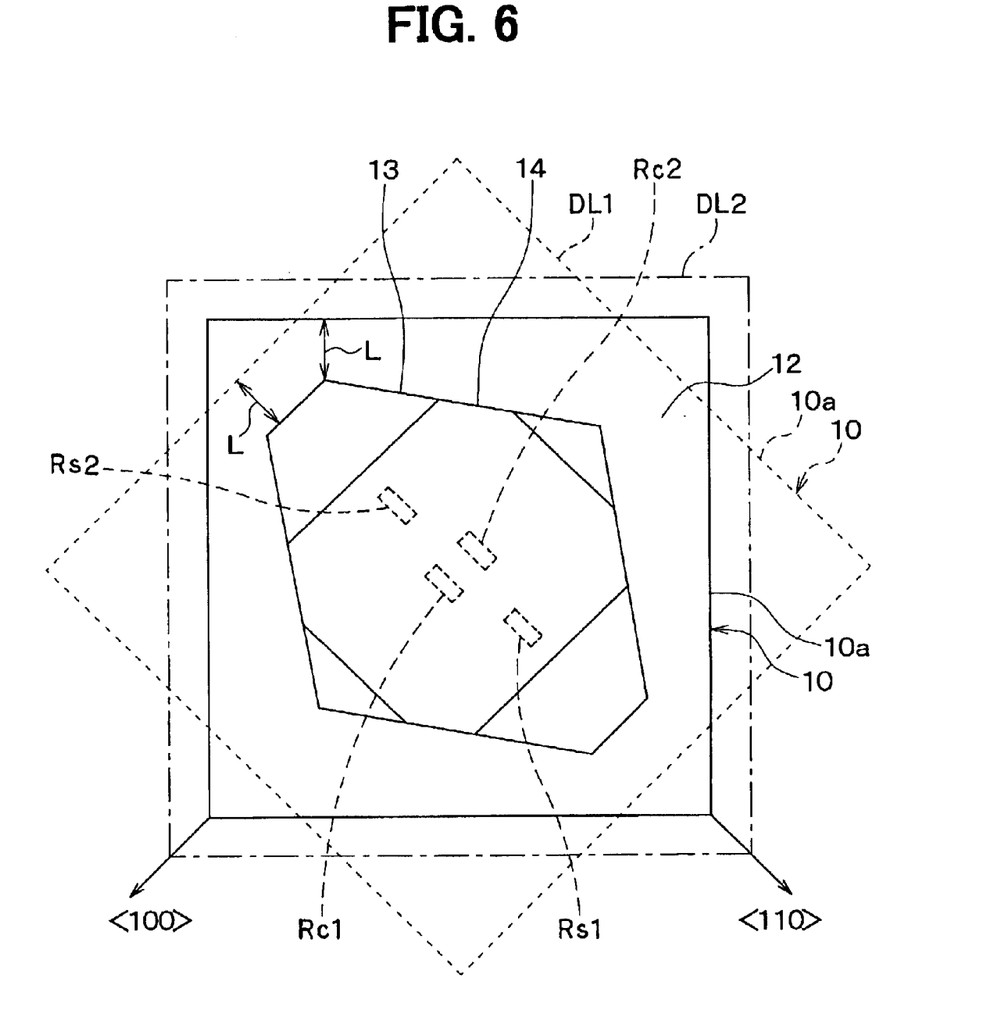
FIG. 6 is a view showing dimensional differences between the proposed pressure sensor of FIG. 12 and the pressure sensor of FIG. 3.

In FIG. 6, the sides 10a of the proposed sensor of FIG. 12 and those of the sensor S1 of FIG. 3 are designed such that the diaphragms 14 of the two sensors have the same dimension and the back surfaces 12 of the two sensors provide the same minimum width L of the contact area between the back surface 12 of semiconductor substrate 10 and the glass stand 50. In FIG. 6, a first dotted line DL1 shows the sides 10a of the proposed sensor of FIG. 12. For the sake of convenience in comparison in size between the proposed sensor of FIG. 12 and the sensor S1 of FIG. 3, a second dotted line DL2, which is acquired by rotating the first dotted line DL1 by 45 degrees, is also shown in FIG. 6.

As understood from FIG. 6, the sensor S1 of FIG. 3, the sides 10a of which are at an angle of substantially 45 degrees with the crystallographic axis of <110> orientation, can be smaller than the proposed sensor of FIG. 12, the sides 10a of which are substantially parallel or orthogonal to the crystallographic axis of <110> orientation, without shrinking the diaphragm 14 or shortening the minimum width L of the contact area between the back surface 12 and the glass stand 50. In FIG. 6, if the sides 10a of the proposed sensor of FIG. 12 are set to be 2.78 mm long, the sides 10a of the sensor S1 of FIG. 3 become 2.44 mm long. As a result, the die size of the sensor S1 of FIG. 3 is smaller than that of the proposed sensor of FIG. 12 by 23%.

On the contrary, if the sides 10a of the sensor S1 of FIG. 3 are set to have the same length as the sides 10a of the proposed sensor of FIG. 12, the sensor S1 of FIG. 3 has a minimum width L longer than that of the proposed sensor of FIG. 12. As a result, the sensor S1 of FIG. 3 has higher reliability in the bond between the back surface 12 of semiconductor substrate 10 and the glass stand 50 than the proposed sensor of FIG. 12. Therefore, the pressure reference chamber of the sensor S1 of FIG. 3 has higher hermeticity, or higher capability of suppressing leakage, than that of the proposed sensor of FIG. 12.

The above-mentioned size reduction effect is unique to the diaphragm-type semiconductor pressure sensor S1 of FIG. 3, which includes the (110) semiconductor substrate 10. For example, a diaphragm-type semiconductor pressure sensor of FIGS. 7A and 7B includes a (100) semiconductor substrate J10, or, a semiconductor substrate J10 that has an active surface J11 having a crystallographic face of (100) orientation and a back surface J12, which is opposite to the active surface, having a crystallographic face of (100) orientation, and four sides J10a.

Figure 7A:
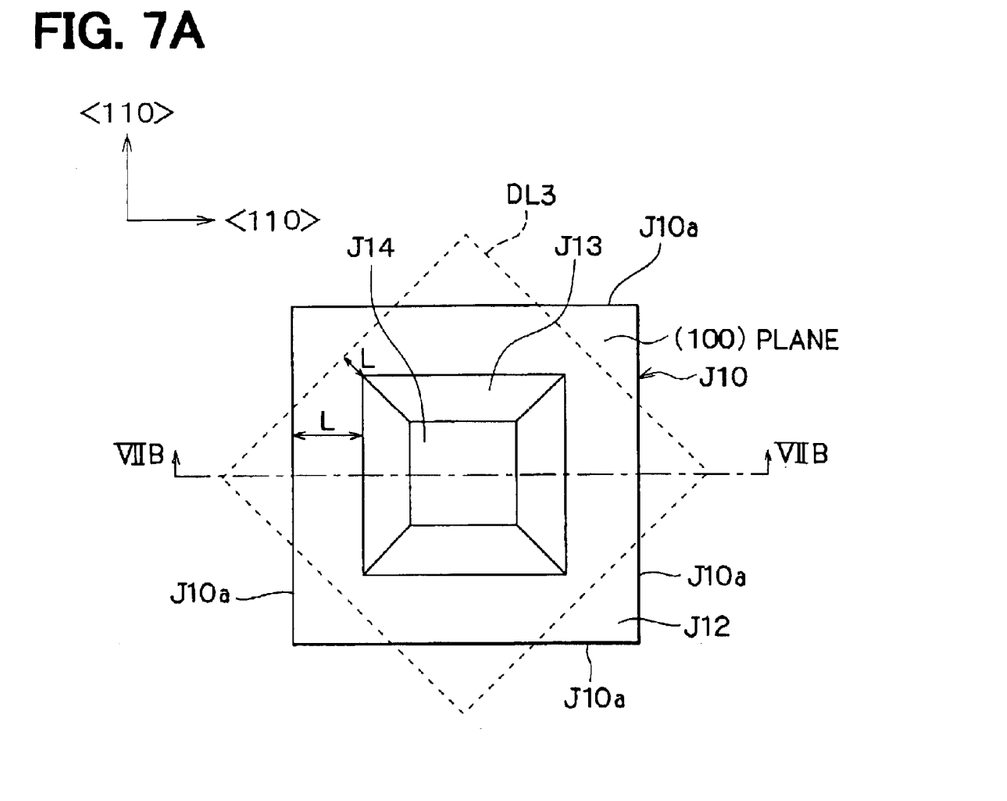
FIG. 7A is a schematic plan view of a diaphragm-type semiconductor pressure sensor that includes a (100) semiconductor substrate when viewed from the back surface thereof.
Figure 7B:
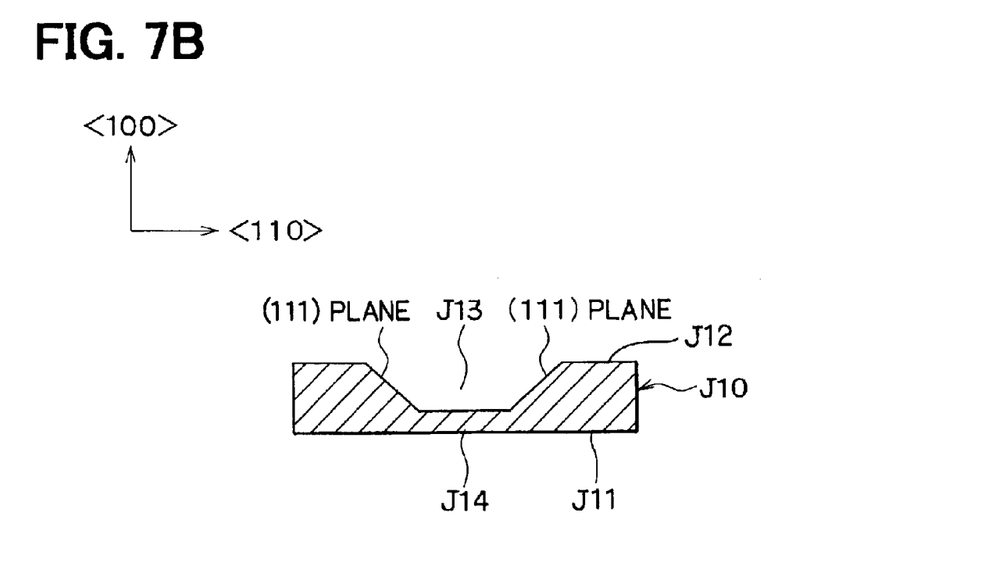
FIG. 7B is a schematic cross-sectional view of the pressure sensor of FIG. 7A taken along the line VIIB—VIIB.

The pressure sensor of FIG. 7A has a recess J13, at the bottom of which a diaphragm J14 is located. The recess J13 is defined by the diaphragm J14 and four sidewalls. Each of the four sidewalls is a crystallographic plane of (111) orientation because when the recess J13 is formed by anisotropic etching, the etching rate of crystallographic planes of (111) orientation is lower than crystallographic planes of other orientations.

Therefore, each of the four sidewalls is substantially parallel to a crystallographic axis of <110> orientation. Thus, the minimum width L of the contact area between the back surface J12 of and a glass stand that is bonded to the back surface J12 becomes the maximum when each of the four sides J10a is set to be substantially parallel to a crystallographic axis of <110> orientation substantially parallel to the active surface J11, as shown in FIG. 7A. For the sake of convenience, a third dotted line DL3, which is acquired by rotating the four sides J10a by 45 degrees, is also shown in FIG. 7.

Figure 8:
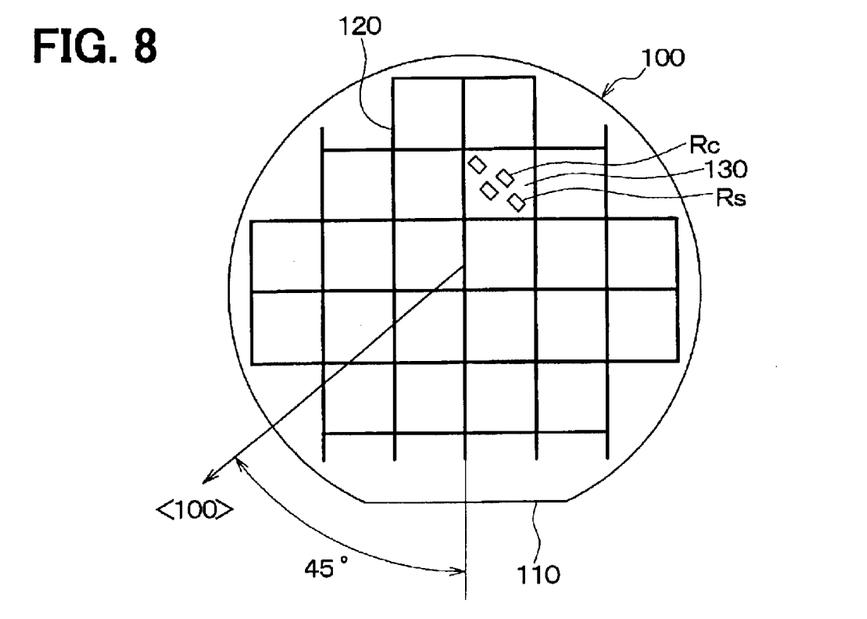
FIG. 8 is a schematic plan view of a semiconductor wafer from which the semiconductor pressure sensor of FIG. 1 is manufactured.

The sensor S1 of FIG. 3 is manufactured using a semiconductor wafer 100 of FIG. 8, which includes a (110) semiconductor layer that has an active surface having a crystallographic face of (110) orientation and a back surface, which is opposite to the active surface, having a crystallographic face of (110) orientation. The active surface and the back surface of the (110) semiconductor wafer become the active surface 11 and the back surface 12 of the semiconductor substrate 10 of FIG. 2.

As shown in FIG. 8, the wafer 100 has an orientation flat 110 and scribe lines 120. Each of the scribe lines 120 is substantially parallel or orthogonal to the orientation flat 110. Each of rectangular regions 130, which are defined by the scribe lines 120, becomes a sensor S1 of FIG. 1 when the wafer 100 is diced. As shown in FIG. 8, the orientation flat 110 has been formed to be at an angle of substantially 45 degrees with a crystallographic face of (100) orientation that is substantially orthogonal to the active surface of the (110) semiconductor layer. In FIG. 8, a crystallographic axis of <100> orientation that is substantially parallel to the active surface of the wafer 100 is shown. The crystallographic face of (100) orientation is orthogonal to the crystallographic axis of <100> orientation.

Figure 9:
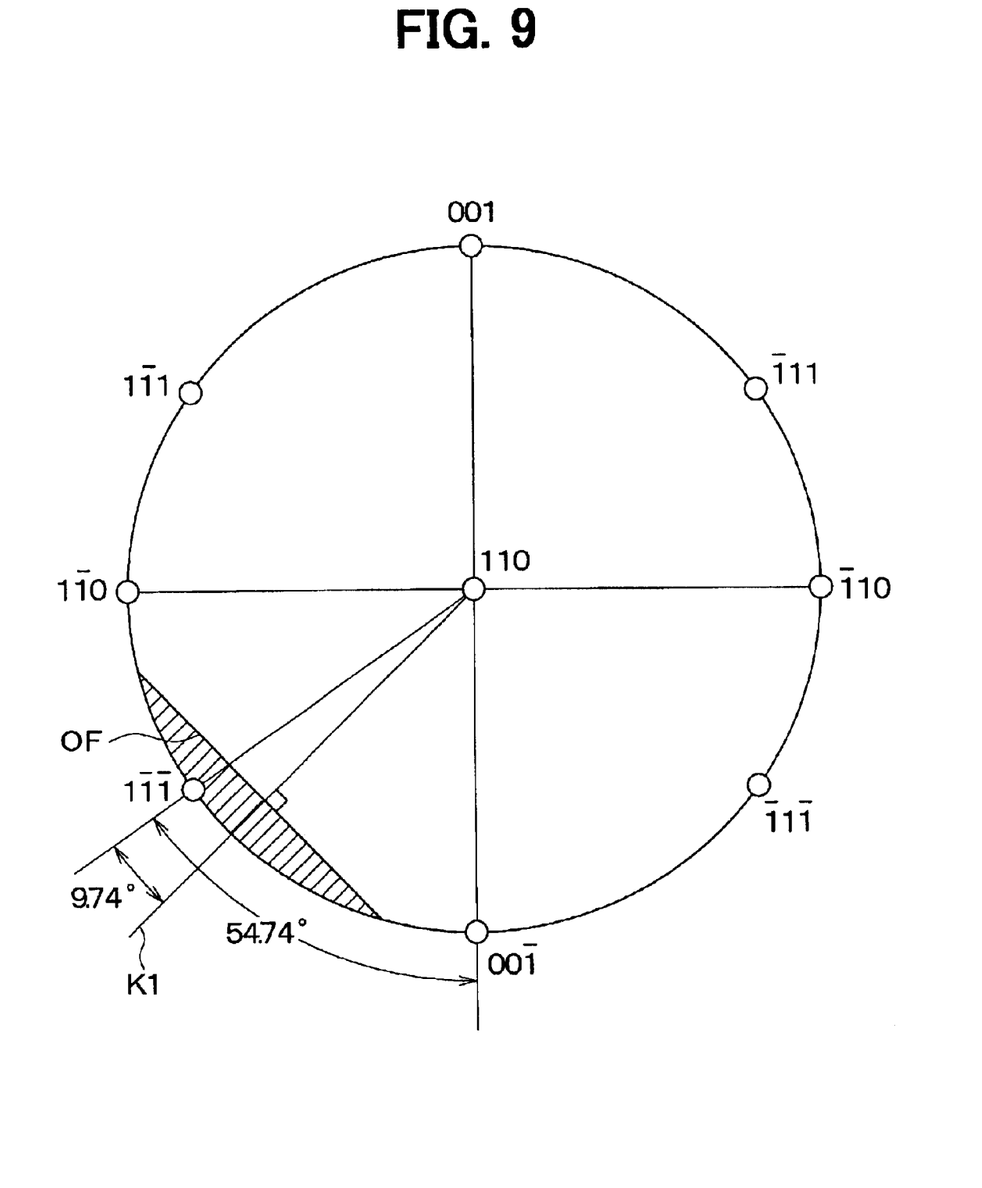
FIG. 9 is a view showing the orientations of fundamental crystallographic faces orthogonal to a crystallographic face of (110) orientation.

The orientation flat 110 is formed in the process for manufacturing the (100) semiconductor wafer using fundamental crystallographic axes of a single crystal silicon ingot. As shown in FIG. 9, two crystallographic axes of <110> and <001> orientations, which are orthogonal to each other, exist on a crystallographic plane of (110) orientation in the silicon ingot. A crystallographic axis of <111> orientation, which is at an angle of 54.74 degrees with the crystallographic axis of <001> orientation, also exist on the crystallographic plane of (110) orientation in the silicon ingot.

Therefore, first, the above axes are determined using, for example, X-ray diffraction on the basis of the angular relations between the above axes in a single crystal silicon ingot. Then, a target axis K1, which is at an angle of 9.74 degrees with the crystallographic axis of <111> orientation as shown in FIG. 9, is determined. The target axis K1 is at an angle of 45 degrees with the two crystallographic axes of <110> and <001> orientations. Then, the ingot is grinded such that a surface OF that is substantially orthogonal to the target axis K1 is exposed. The surface OF becomes the orientation flat 110, which is at an angle of substantially 45 degrees with the crystallographic face of (100) orientation that is substantially orthogonal to the active surface of the (100) semiconductor layer. Therefore, the orientation flat 110 becomes at an angle of substantially 45 degrees with a crystallographic axis of <110> orientation and a crystallographic axis of <001> orientation, which are substantially parallel to the active surface of the (110) semiconductor layer.

Next, the ingot is sliced to form a silicon wafer. Then, elements such as gauge resistors Rc1, Rc2, Rs1, Rs2, metal wiring lines 21, and metal pads 22 are formed using well-known semiconductor chip manufacturing technique in or on the active surface of the silicon wafer in each of rectangular regions 130. In the process of forming the elements, scribe lines 120 are formed on the silicon wafer to partition the silicon wafer into the rectangular regions 130. Each of the scribe lines 120 are defined, for example, using linier openings of a film or using a pair of substantially parallel lines made of, for example, aluminum. Then, a diaphragm 14 is formed in each of rectangular regions 130 in the active surface of the silicon wafer by forming a recess 13 in the back surface of the silicon wafer. The recess 13 is formed by anisotropically etching the silicon wafer from the back surface. With the above steps, a semiconductor wafer 100 of FIG. 8 is completed.

A diaphragm-type semiconductor pressure sensors S1 of FIG. 1, the semiconductor substrate 10 of which includes four sides 10a that are at an angle of substantially 45 degrees with the crystallographic axis of <110> orientation that is substantially parallel to the active surface of the substrate 10, can be formed by dicing the semiconductor wafer 100 of FIG. 8 along the scribe lines 120.

Figure 10:
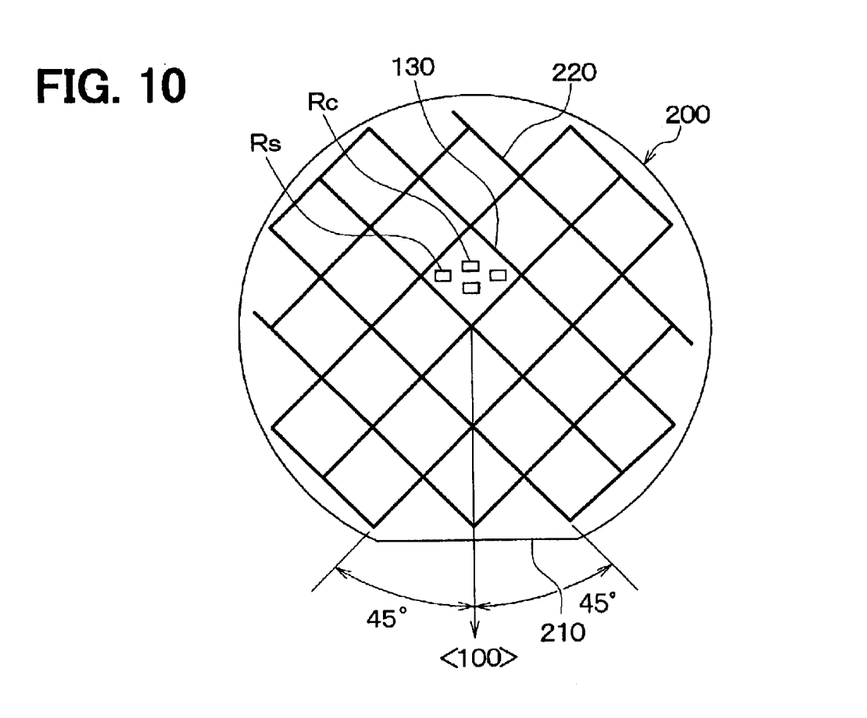
FIG. 10 is a schematic plan view of another semiconductor wafer from which the semiconductor pressure sensor of FIG. 1 is manufactured.

A diaphragm-type semiconductor pressure sensor S1 of FIG. 1 can be also manufactured using another semiconductor wafer 200 of FIG. 10, which includes a (110) semiconductor layer that has an active surface having a crystallographic face of (110) orientation and a back surface, which is opposite to the active surface, having a crystallographic face of (110) orientation. As shown in FIG. 10, the wafer 200 of FIG. 10 has an orientation flat 210 and scribe lines 220. As shown in FIG. 10, the orientation flat 210 has a crystallographic face of (100) orientation that is substantially orthogonal to the active surface of the (110) semiconductor layer, and each of the scribe lines 220 is at an angle of substantially 45 degrees with the orientation flat 210.

Each of rectangular regions 130, which are defined by the scribe lines 220, becomes a pressure sensor S1 of FIG. 1 when the wafer 200 of FIG. 10 is diced. In each of the rectangular regions 130, a diaphragm 14 and elements such as gauge resistors Rc1, Rc2, Rs1, Rs2, metal wiring lines 21, and metal pads 22 have been formed. The gauge resistors Rc1, Rc2, Rs1, Rs2 have been formed in the arrangement shown in FIG. 4. In the wafer 200 of FIG. 10, each of the gauge resistors Rc1, Rs1, Rc2, Rs2, has been folded to form a plurality of beams, the longitudinal directions of which are substantially parallel to the orientation flat 210, although, in the wafer 100 of FIG. 8, each of the gauge resistors Rc1, Rs1, Rc2, Rs2, has been folded to form a plurality of beams, the longitudinal directions of which are at an angle of substantially 45 degrees with the orientation flat 110.

In the pressure sensor S1 of FIG. 1, the angle between the four sides 10a and the crystallographic axis of <110> orientation that is substantially parallel to the active surface 11 should be economically preferably in the range of 43 degrees to 47 degrees in consideration of the machining deviation when the wafers 100, 200 of FIG. 8 and FIG. 10 are formed from an silicon ingot and the performance of the pressure sensor S1 of FIG. 1.

Specifically, when the orientation flats 110, 210 are formed on the ingot, the angle between the orientation flats 110, 210 and the criterial crystallographic axis of <100> orientation in the ingot has a deviation of ±1 degree. In addition, when an alignment mark, which is used for aligning masks, are formed on a silicon wafer made from the ingot, the angle between the orientation flats 110, 210 and the alignment mark has a deviation of ±1 degree. As a result, the maximum deviation from the target angle of 45 degrees between the four sides 10a and the crystallographic axis of <110> orientation becomes ±2 degrees. That is, even though the target angle is 45 degrees, the actual angle is 45±2 degrees, or in the range of 43 degrees to 47 degrees.

Figure 11A:
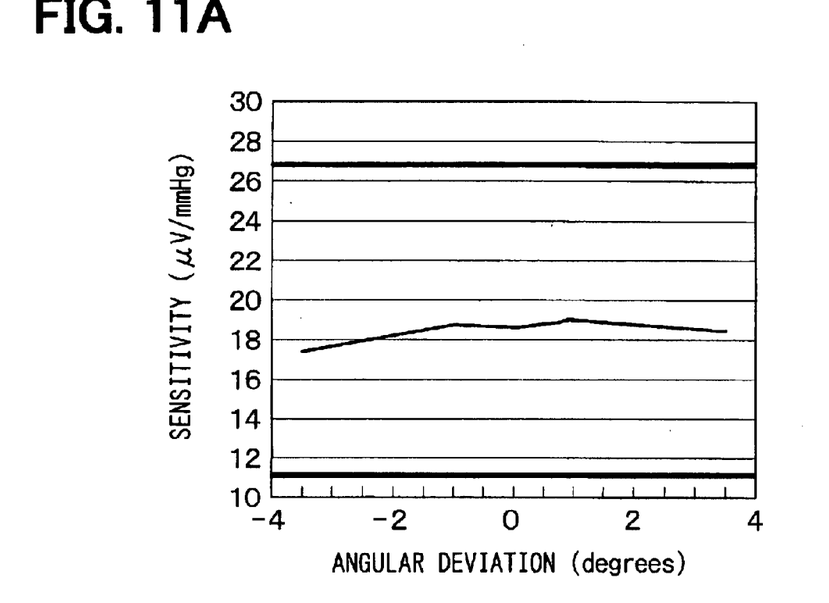
FIG. 11A is a graph showing the correlation between the sensitivity of the pressure sensor and the deviation from the target angle.

However, the maximum deviation of ±2 degrees is acceptable because of the reasons described below. As shown in FIG. 11A, the sensitivity of the pressure sensor S1 of FIG. 1, which is defined as the change rate of the differential potential Vout in FIG. 5 with respect to the pressure externally applied to the diaphragm of the pressure sensor S1, is substantially constant at least when the deviation from the target angle of 45 degrees is within ±2 degrees in consideration of its specification range of 11 to 27 $\mu$V/mmHg.

Figure 11B:
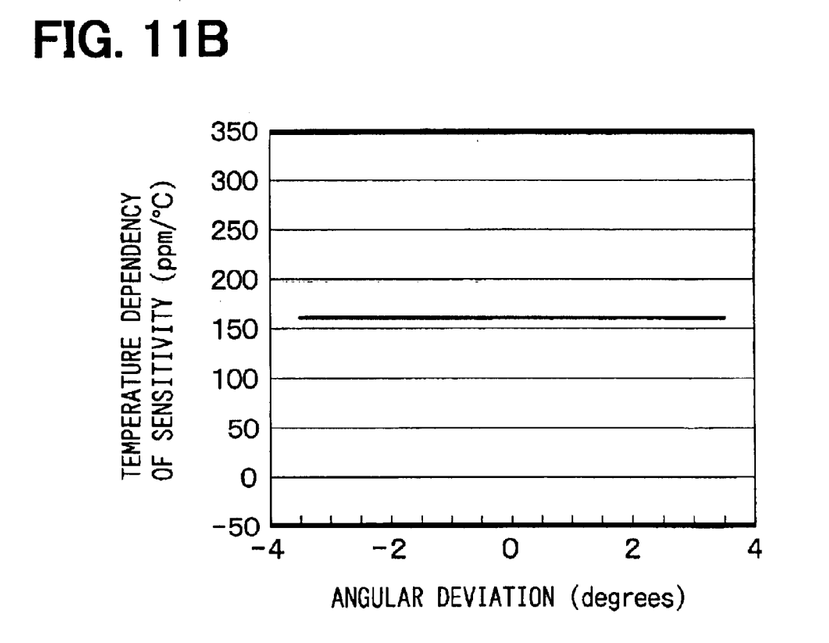
FIG. 11B is a graph showing the correlation between the temperature dependency of the sensitivity and the deviation from the target angle.

In addition, as shown in FIG. 11B, the temperature dependency of the sensitivity is also substantially constant at least when the deviation from the target angle of 45 degrees is within ±2 degrees in consideration of its specification range of −50 to 350 ppm/° C. In FIG. 11B, the temperature dependency of the sensitivity is defined as the change rate of the sensitivity with respect to the temperature within the range of 25 to 125° C. Therefore, the performance of the pressure sensor S1 of FIG. 1 is substantially constant as long as the deviation from the target angle of 45 degrees is within ±2 degrees.

The inventors of the present invention conducted FEM analysis on the thermal stress generated in the semiconductor substrate 10 of FIG. 12 and the thermal stress generated in the semiconductor substrate 10 of FIG. 3. Although not shown in the figure, the FEM analysis showed that the deviation of the thermal stresses generated in the gauge resistors Rc1, Rs1, Rc2, Rs2 is smaller in the substrate 10 of FIG. 3 than that in substrate 10 of FIG. 12.

The reason is speculated as follows. The side gauge resistors Rs1, Rs2 are more susceptible to the thermal stress caused by an external factor such as the glass stand 50 than the center gauge resistors Rc1, Rc2. As shown in FIG. 6, the side gauge resistors Rs1, Rs2 are more distant from the perimeter of the substrate 10 along the crystallographic axis of <110> orientation in the substrate 10 of FIG. 12 than in the substrate 10 of FIG. 3. Therefore, the thermal stress caused by the external factor is smaller in the substrate 10 of FIG. 3 than in the substrate 10 of FIG. 12.

In addition, the thermal stress caused inherently by the substrate 10 tends to concentrate at the corners of the diaphragm 14. As shown in FIG. 6, the substrate 10 of FIG. 3 is smaller than the substrate 10 of FIG. 12, so the corners closer to the perimeter of the substrate 10 in the substrate 10 of FIG. 3 than the substrate 10 of FIG. 12. Therefore, the thermal stress caused inherently by the substrate 10 tends less to concentrate at the corners in the substrate 10 of FIG. 3 than in the substrate 10 of FIG. 12.

With the above reasons, the deviation of the thermal stresses generated in the gauge resistors Rc1, Rs1, Rc2, Rs2 is smaller in the substrate 10 of FIG. 3 than that in substrate 10 of FIG. 12. Due to the smaller deviation, the pressure sensor S1 of FIG. 1 has smaller offset voltage in the differential potential Vout than the pressure sensor of FIG. 12.

What is claimed is:

1. A diaphragm-type semiconductor pressure sensor comprising a substantially rectangular (110) semiconductor substrate, which has four sides, an active surface of (110) crystallographic face orientation, and a back surface, which is opposite to the active surface, of (110) crystallographic face orientation, wherein each of the surfaces is surrounded by the four sides, wherein each of the four sides is at an angle of substantially 45 degrees with a crystallographic axis of <110> orientation that is substantially parallel to the active surface, wherein the substrate includes a diaphragm in the active surface, wherein the diaphragm has been formed by forming a recess in the back surface, wherein the diaphragm includes a gauge resistor, and wherein a pressure is detected on a basis of a variation in a resistance of the gauge resistor.

2. The pressure sensor according to claim 1, wherein the angle of substantially 45 degrees is in the range of 43 degrees to 47 degrees.

3. The pressure sensor according to claim 1, wherein the gauge resistor substantially extends along the crystallographic axis of <110> orientation to increase a sensitivity in the variation in the resistance.

4. The pressure sensor according to claim 1, wherein the diaphragm includes three more gauge resistors and wherein all the four gauge resistors are used to form a Wheatstone bridge.

5. The pressure sensor according to claim 1, wherein the sensor is used with a sealing substrate, which has been bonded to the back surface of the (110) semiconductor substrate to seal the recess in order to form a pressure reference chamber, when the pressure is detected.

6. A semiconductor wafer used for manufacturing a diaphragm-type semiconductor pressure sensor comprising a (110) semiconductor layer, which includes an active surface of (110) crystallographic face orientation, and a back surface, which is opposite to the active surface, of (110) crystallographic face orientation, and an orientation flat, wherein a plurality of scribe lines are located on the active surface, wherein the orientation flat is at an angle of substantially 45 degrees with a crystallographic face of (100) orientation that is substantially orthogonal to the active surface of the (110) semiconductor layer, wherein the orientation flat is at an angle of substantially 45 degrees with a crystallographic axis of <001> orientation that is substantially parallel to the active surface of the (110) semiconductor layer, wherein each of the scribe lines is substantially parallel or orthogonal to the orientation flat, wherein the (110) semiconductor layer includes substantially rectangular regions, which are defined by the scribe lines, wherein each of the regions includes a diaphragm in the active surface, wherein the diaphragm has been formed by forming a recess in the back surface, wherein the diaphragm includes a gauge resistor, and wherein a pressure is detected on a basis of a variation in the resistance of the gauge resistor in a diaphragm-type semiconductor pressure sensor manufactured from the semiconductor wafer.

7. The semiconductor wafer according to claim 6, wherein the angle of substantially 45 degrees is in the range of 43 degrees to 47 degrees.

8. The semiconductor wafer according to claim 6, wherein the gauge resistor substantially extends along a crystallographic axis of <110> orientation that is substantially parallel to the active surface to increase a sensitivity in the variation in the resistance.

9. The semiconductor wafer according to claim 6, wherein the diaphragm includes three more gauge resistors and wherein all the four gauge resistors are used to form a Wheatstone bridge.

10. A semiconductor wafer used for manufacturing a diaphragm-type semiconductor pressure sensor comprising a (110) semiconductor layer, which includes an active surface of (110) crystallographic face orientation, and a back surface, which is opposite to the active surface, of (110) crystallographic face orientation, and an orientation flat, wherein a plurality of scribe lines are located on the active surface, wherein the orientation flat has a crystallographic face of (100) orientation that is substantially orthogonal to the active surface, wherein each of the scribe lines is at an angle of substantially 45 degrees with the orientation flat, wherein the (110) semiconductor layer includes substantially rectangular regions, which are defined by the scribe lines, wherein each of the regions includes a diaphragm in the active surface, wherein the diaphragm has been formed by forming a recess in the back surface, wherein the diaphragm includes a gauge resistor, and wherein a pressure is detected on a basis of a variation in the resistance of the gauge resistor in a diaphragm-type semiconductor pressure sensor manufactured from the semiconductor wafer.

11. The semiconductor wafer according to claim 10, wherein the angle of substantially 45 degrees is in the range of 43 degrees to 47 degrees.

12. The semiconductor wafer according to claim 10, wherein the gauge resistor substantially extends along a crystallographic axis of <110> orientation that is substantially parallel to the active surface to increase a sensitivity in the variation in the resistance.

13. The semiconductor wafer according to claim 10, wherein the diaphragm includes three more gauge resistors and wherein all the four gauge resistors are used to form a Wheatstone bridge.

* * * * *